United States Patent [19]
Yoda

[11] Patent Number: 5,832,200
[45] Date of Patent: Nov. 3, 1998

[54] DATA STORAGE APPARATUS INCLUDING PLURAL REMOVABLE RECORDING MEDIUMS AND HAVING DATA REPRODUCING FUNCTION

[75] Inventor: Nobuhisa Yoda, Kawasaki, Japan

[73] Assignee: Kabushiki Kaisha Toshiba, Kawasaki, Japan

[21] Appl. No.: 619,342

[22] Filed: Mar. 21, 1996

[30] Foreign Application Priority Data

Mar. 23, 1995 [JP] Japan .................................. 7-064230

[51] Int. Cl.[6] ........................................................ G06F 11/16
[52] U.S. Cl. ............................... 395/182.04; 395/182.05; 395/282; 711/115; 711/120
[58] Field of Search ......................... 395/182.04, 182.01, 395/182.05, 441, 442, 447, 483, 486, 282, 283, 284, 828, 833, 876; 371/2.2, 8.1, 21.1, 40.1, 10.2, 21.2, 40.11, 40.2, 40.15, 40.16; 711/114, 115, 119, 120, 133, 159

[56] References Cited

U.S. PATENT DOCUMENTS

| | | | |
|---|---|---|---|
| 3,768,071 | 10/1973 | Knauft et al. .......................... | 371/10.2 |
| 4,314,331 | 2/1982 | Porter et al. ............................ | 364/200 |
| 4,608,688 | 8/1986 | Hansen et al. .......................... | 371/10.2 |
| 4,835,686 | 5/1989 | Furuya et al. .......................... | 364/200 |
| 4,969,088 | 11/1990 | McAuliffe et al. ..................... | 364/228.1 X |
| 5,177,744 | 1/1993 | Cesare et al. .......................... | 371/10.1 |
| 5,195,096 | 3/1993 | Moore ..................................... | 371/21.1 |
| 5,233,618 | 8/1993 | Glider et al. ........................... | 395/182.04 |
| 5,255,270 | 10/1993 | Yanoi et al. ............................ | 371/10.2 |
| 5,313,612 | 5/1994 | Sotoh et al. ............................ | 395/425 |
| 5,390,187 | 2/1995 | Stallmo .................................. | 371/10.1 |
| 5,390,327 | 2/1995 | Lubbers et al. ........................ | 395/182.04 |
| 5,402,428 | 3/1995 | Kakuta et al. .......................... | 371/8.1 |
| 5,418,852 | 5/1995 | Itami et al. ............................. | 380/4 |
| 5,434,868 | 7/1995 | Aichelmann et al. ................. | 371/10.1 |
| 5,485,439 | 1/1996 | Hamasaka et al. .................... | 369/58 X |
| 5,522,031 | 5/1996 | Ellis et al. .............................. | 395/182.04 |
| 5,659,801 | 8/1997 | Kopsaftis ............................... | 395/882 |

FOREIGN PATENT DOCUMENTS 2-236714  9/1990  Japan .

*Primary Examiner*—Dieu-Minh Le
*Attorney, Agent, or Firm*—Cushman Darby & Cushman IP Group of Pillsbury Madison & Sutro LLP

[57] ABSTRACT

A data processing apparatus comprises a mechanism for removably holding a plurality of removable storage mediums, a mechanism for detecting an inaccessible one included in the removable storage mediums held by the holding mechanism, and a mechanism for restoring the data stored in the detected removable storage medium on the basis of data stored in the other removable storage mediums, and storing the restored data in another removable storage medium.

13 Claims, 15 Drawing Sheets

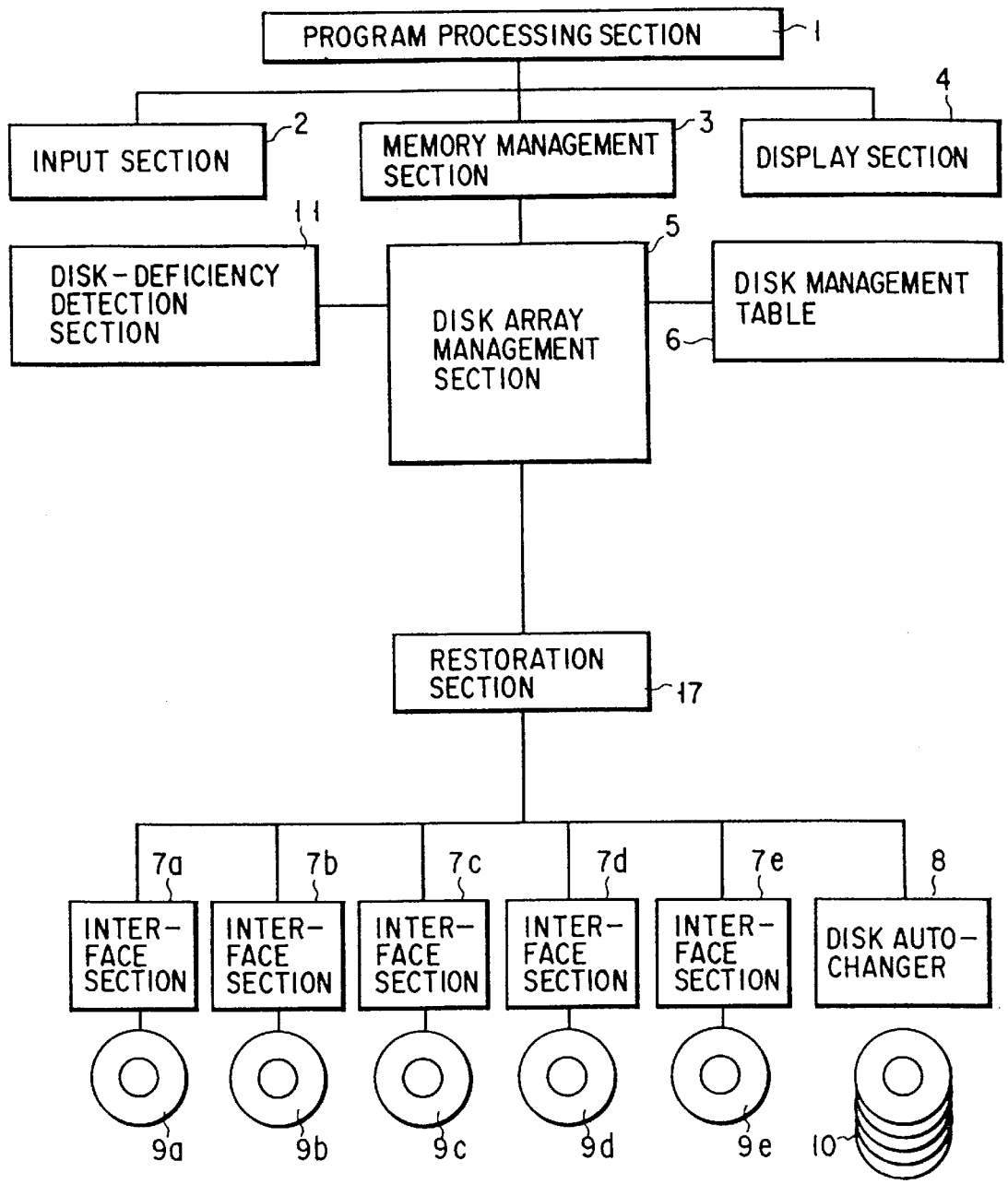
F I G. 1

| DISK IDENTIFIER | MOUNTING PLACE | TEMPORARY-DEFICIENCY FLAG | IDENTIFIER FOR SUBSTITUTION DISK | WRITE-PROHIBITED FLAG | DETACHMENT-PROHIBITED FLAG |
|---|---|---|---|---|---|
| 101 | FIRST DRIVE | ON (TEMPORARY-DEFICIENT) | | WRITE PROHIBITED | PERMITTED |
| 102 | SECOND DRIVE | OFF | | WRITE PROHIBITED | PERMITTED |
| 103 | OUT-OF-APPARATUS | | 800 | WRITE PROHIBITED | PERMITTED |
| 104 | FOURTH DRIVE | OFF | | WRITE PROHIBITED | PERMITTED |
| 105 | FIFTH DRIVE | OFF | | WRITE PROHIBITED | PERMITTED |
| 201 | OUT-OF-APPARATUS | ON | 802 | WRITE PROHIBITED | PERMITTED |
| 800 | THIRD DRIVE | OFF | 103 | WRITE PROHIBITED | PERMITTED |
| 801 | AC-SLOT 01 | OFF | | WRITE PROHIBITED | PERMITTED |
| 802 | OUT-OF-APPARATUS | ON | 201 | WRITE PROHIBITED | PERMITTED |
| 803 | AC-SLOT 02 | OFF | | WRITE PROHIBITED | PERMITTED |

F I G. 2

| IDENTIFIER FOR DISKS WHICH CONSTITUTE SYSTEM (PRESENT DISK 101) |
|---|
| 101 |
| 102 |
| 103 |
| 104 |
| 105 |

F I G. 3

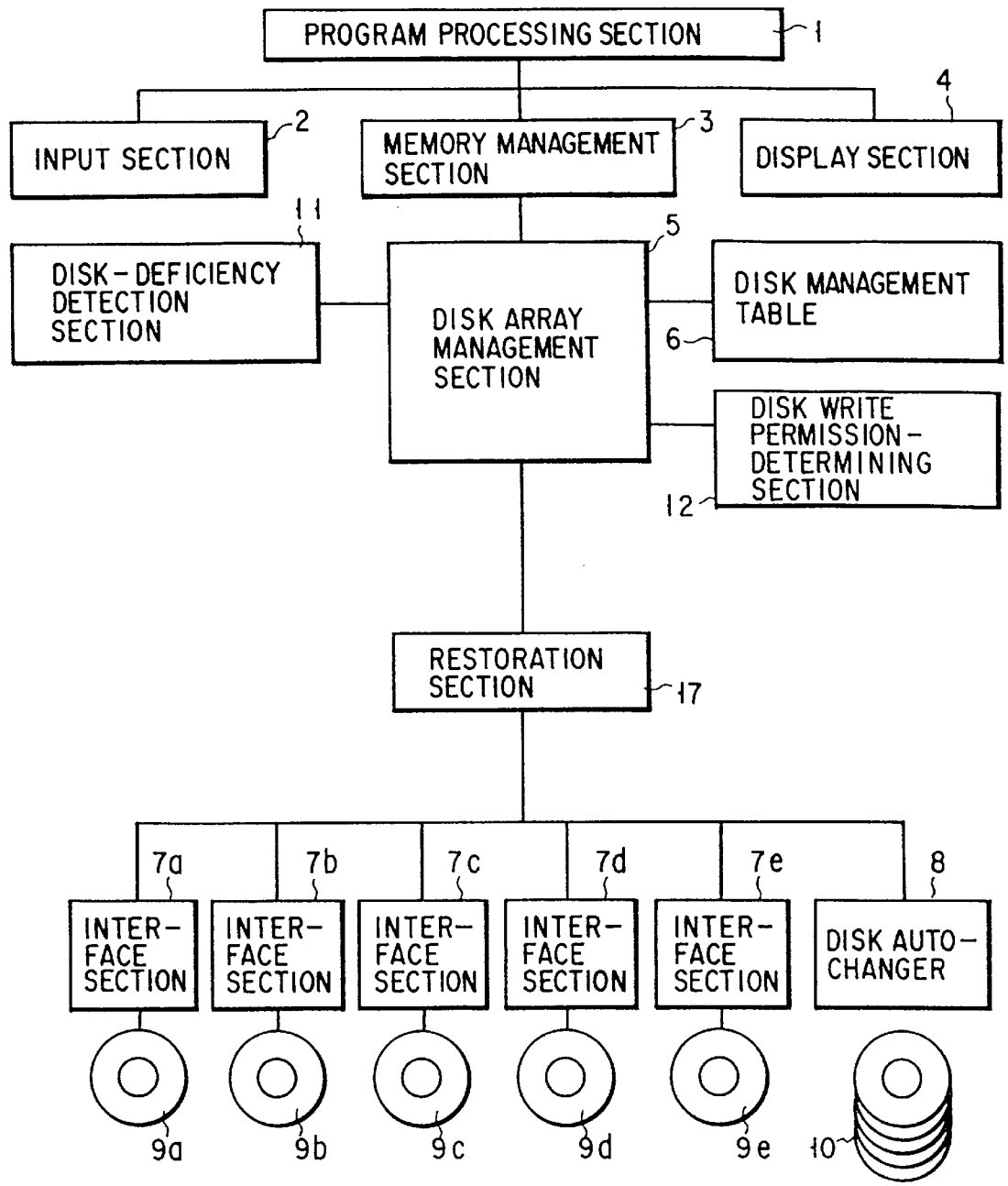
F I G. 5

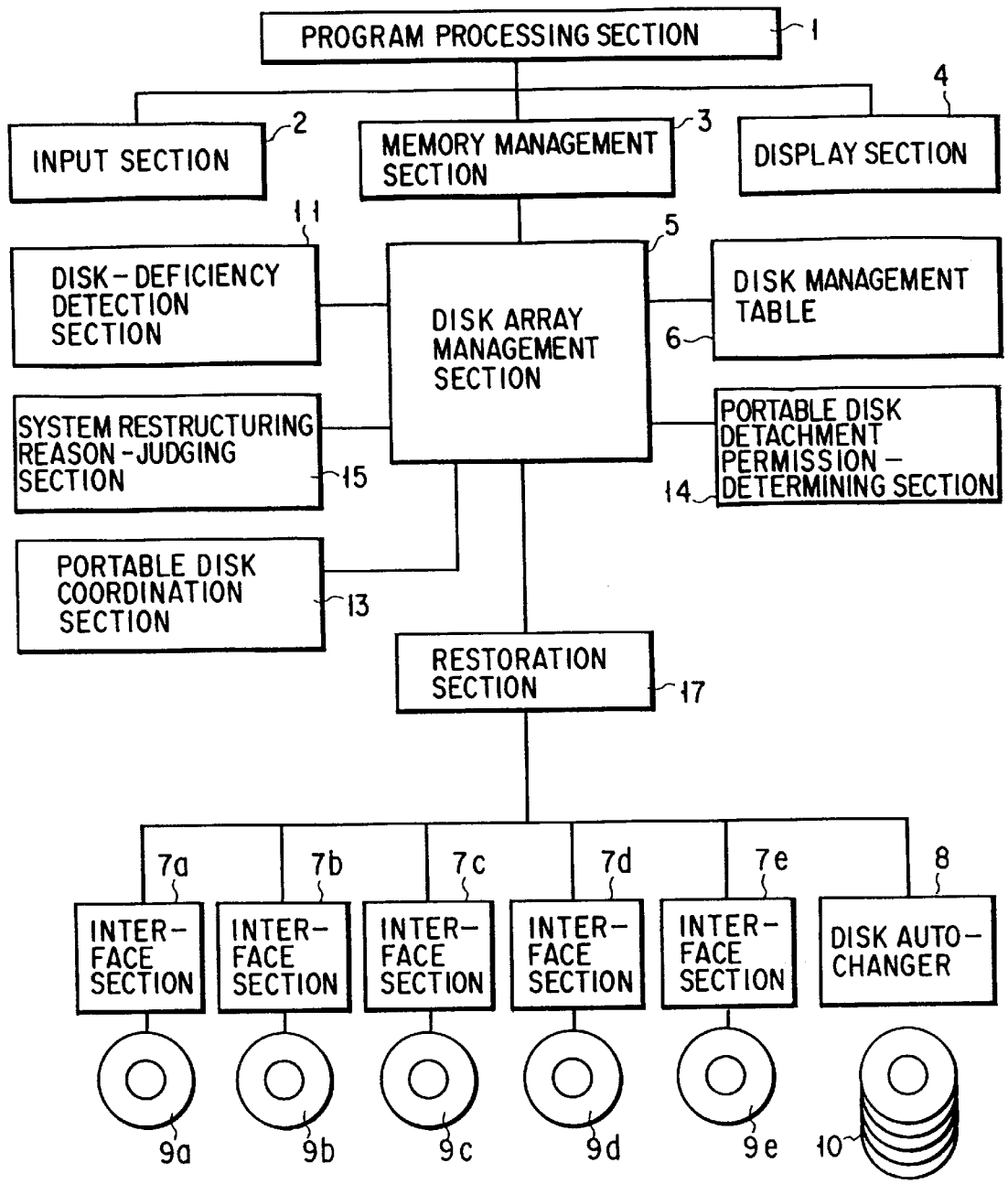
F I G. 10

| DISK IDENTIFIER | TIME & DATE | NAME OF USER WHO DATACHED DISK |
|---|---|---|
| 802 | 950125 : 1030 | XXX |
| | | |

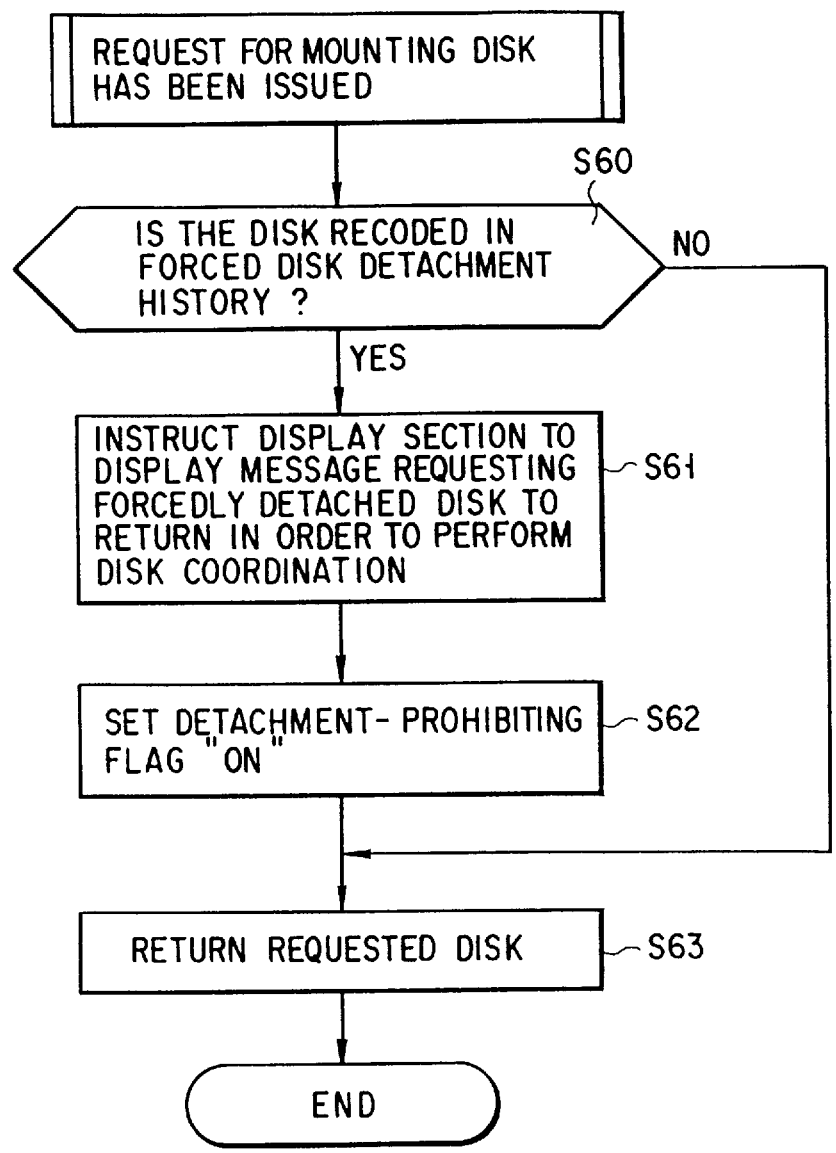
F I G. 16

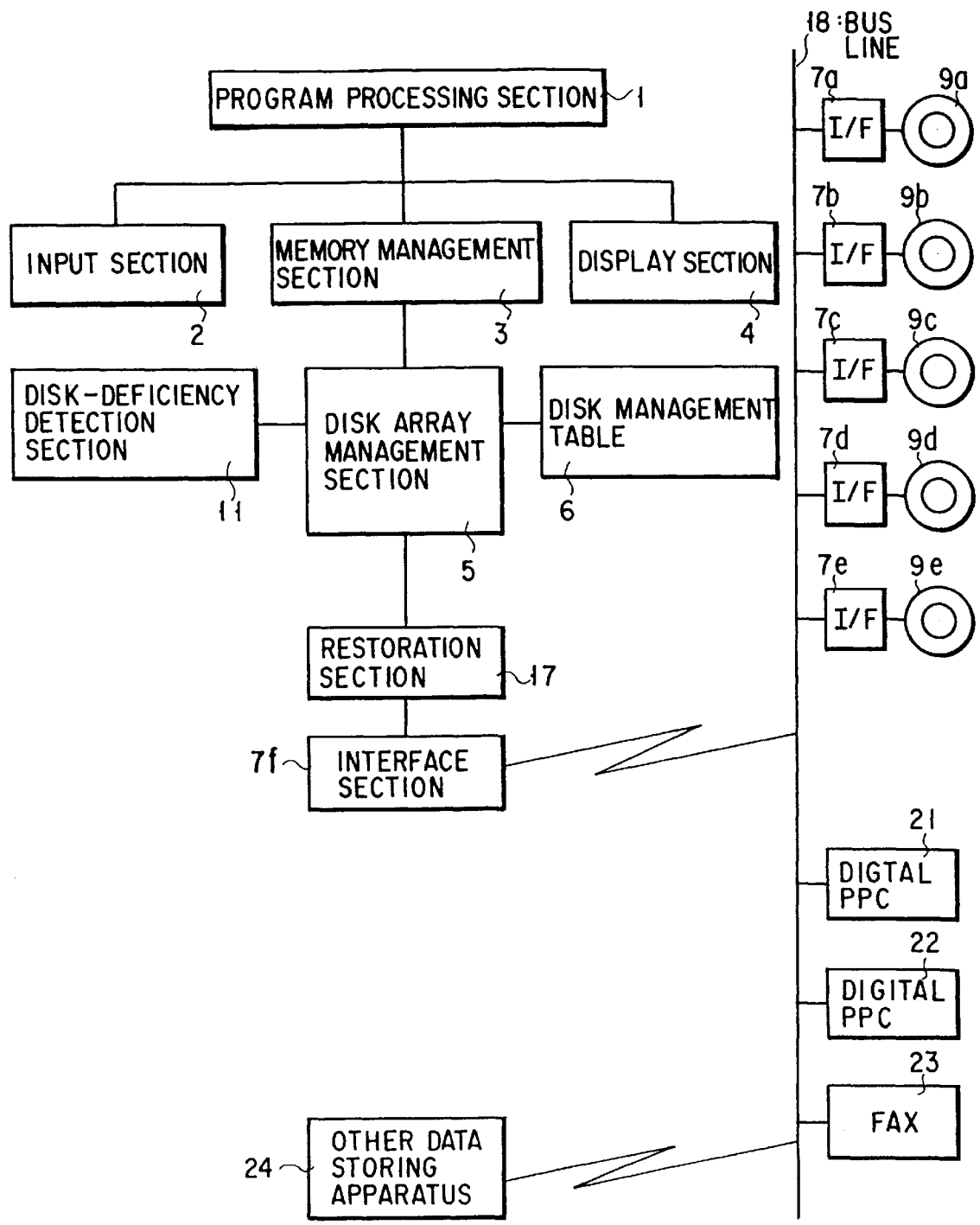
F I G. 17

DATA STORAGE APPARATUS INCLUDING PLURAL REMOVABLE RECORDING MEDIUMS AND HAVING DATA REPRODUCING FUNCTION

BACKGROUND OF THE INVENTION

1. Field of the Invention

This invention relates to a disk array (RAID=Redundant Array of Inexpensive Disks) apparatus including a plurality of removable recording mediums which are connected parallel to each other and constitute a single storage unit.

2. Description of the Related Art

Disk array apparatuses (RAIDs), wherein a plurality of data recording mediums such as hard disks, optical disks, etc. (hereinafter simply called "disks") are connected parallel to each other and controlled as a whole, have recently been used widely to speed up data access processing (reading and writing of data) and/or to enhance the resistibility against failure (see U.S. Pat. No. 5,233,618, etc.).

In these data storage apparatuses, data are dispersedly stored in a plurality of disks, and a parity disk is used to realize highly reliable data management. If, for example, data cannot be read from a defective and hence inaccessible disk included in disks necessary to constitute a single disk array, data stored in the inaccessible disk can be restored and the disk array be restructured on the basis of the disks other than the inaccessible one.

In such data storage apparatuses, restructuring of the disk array is premised on the case where there is a defective disk, and not on the case where the disk array is constituted by removable disks, and the user can intentionally take out a voluntary one of the disks of the array and use it in another apparatus.

Where each disk can intentionally be removed from the disk array, the management of the disks is regarded as important. Although it is convenient to the user that each disk can be freely removed from the disk array, he or she needs to grasp which disk stores which data, and where each disk is mounted. In particular, in the disk array apparatus wherein a plurality of disks constitute a single storage unit, it is hard for the user to manage the overall disks.

For example, where one of the disks which constitute the disk array is temporarily removed therefrom, if a request for accessing the removed disk occurs, data stored in it is restored in another disk which is included in the disk array and not yet used, and is then accessed. In this case, however, it is not discriminated whether the reason why the disk cannot be accessed is based on the fact that the disk is defective, or on the fact that the disk is temporarily removed from the disk array. Accordingly, coordination cannot be performed between the contents of the temporarily removed disk and those contents of a substitutional disk, which has restored data corresponding to the contents of the removed disk. As a result, if the substitutional disk is detached, the contents of the same are hard to discriminate from the contents of the temporarily removed disk. Furthermore, it is impossible for the storage apparatus to discriminate the two disks from each other, and it is difficult for the user to manage the overall disks in the apparatus.

SUMMARY OF THE INVENTION

It is the object of the invention to provide a data storage apparatus which includes a plurality of removable recording mediums connected parallel to each other and constituting a single storage unit, which can restore data stored in each recording medium when, for example, the medium is temporarily detached, and can manage the restored data without duplication.

According to a first aspect of the invention, there is provided a data processing apparatus comprising: means for removably holding a plurality of removable storage mediums; means for accessing a first one of the removable storage mediums to store data therein; means for accessing the first removable storage medium to read the data stored therein; means for detecting a second one of the removable storage mediums when the second one is inaccessible; and restoration means for accessing the removable storage mediums other than the second removable storage medium when the detection means has detected the second removable storage medium to be inaccessible, so as to read part of data stored in each of the accessed removable storage mediums, thereby restoring the data stored in the second removable storage medium.

By virtue of the above-described structure, the data processing apparatus of the invention can restore data using data storage mediums such as optical disks which can easily be removed from the apparatus. Specifically, parity data corresponding to data stored in each optical disk is stored therein in a dispersed manner (a disk dedicated to the parity data may be provided). With this structure, if any one of the disks is inaccessible, data stored therein is restored on the basis of the parity data, and thus the original disk system is restructured.

According to another aspect of the invention, there is provided a data processing apparatus comprising: means for removably holding a plurality of removable storage mediums; means for accessing a first one of the removable storage mediums to storing data therein; means for accessing the first removable storage medium to read the data stored therein; means for detecting a second one of the removable storage mediums when the second one is inaccessible; second storage means for restoring the data stored in the second removable storage medium on the basis of data stored in the other removable storage mediums, and storing the restored data in a third removable storage medium; and comparison means for comparing the data stored in the second removable storage medium with the restored data stored in the third removable storage medium when the second removable storage medium has become accessible again, thereby coordinating the data.

As described above, if the removed disk is returned, the restored data is compared with the original data to coordinate the data. Therefore, even in the case of removable storage mediums such as optical disks, the so-called RAID can be formed of them.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a schematic view, showing the structure of a data storage apparatus according to a first embodiment of the invention;

FIG. 2 is a view, showing an example of a disk management table;

FIG. 3 is a view, showing an example of disk array structure definition data;

FIG. 5 is a schematic view, showing the structure of a data storage apparatus according to a second embodiment of the invention;

FIG. 10 is a schematic view, showing the structure of a data storage apparatus according to a sixth embodiment of the invention;

FIG. 16 is a flowchart of another subroutine, useful in explaining the operation of the data storage apparatus of the seventh embodiment; and FIG. 17 is a view, useful in explaining a data storage apparatus network according to a tenth embodiment.

DETAILED DESCRIPTION OF THE PREFERRED EMBODIMENTS

Figure 4:
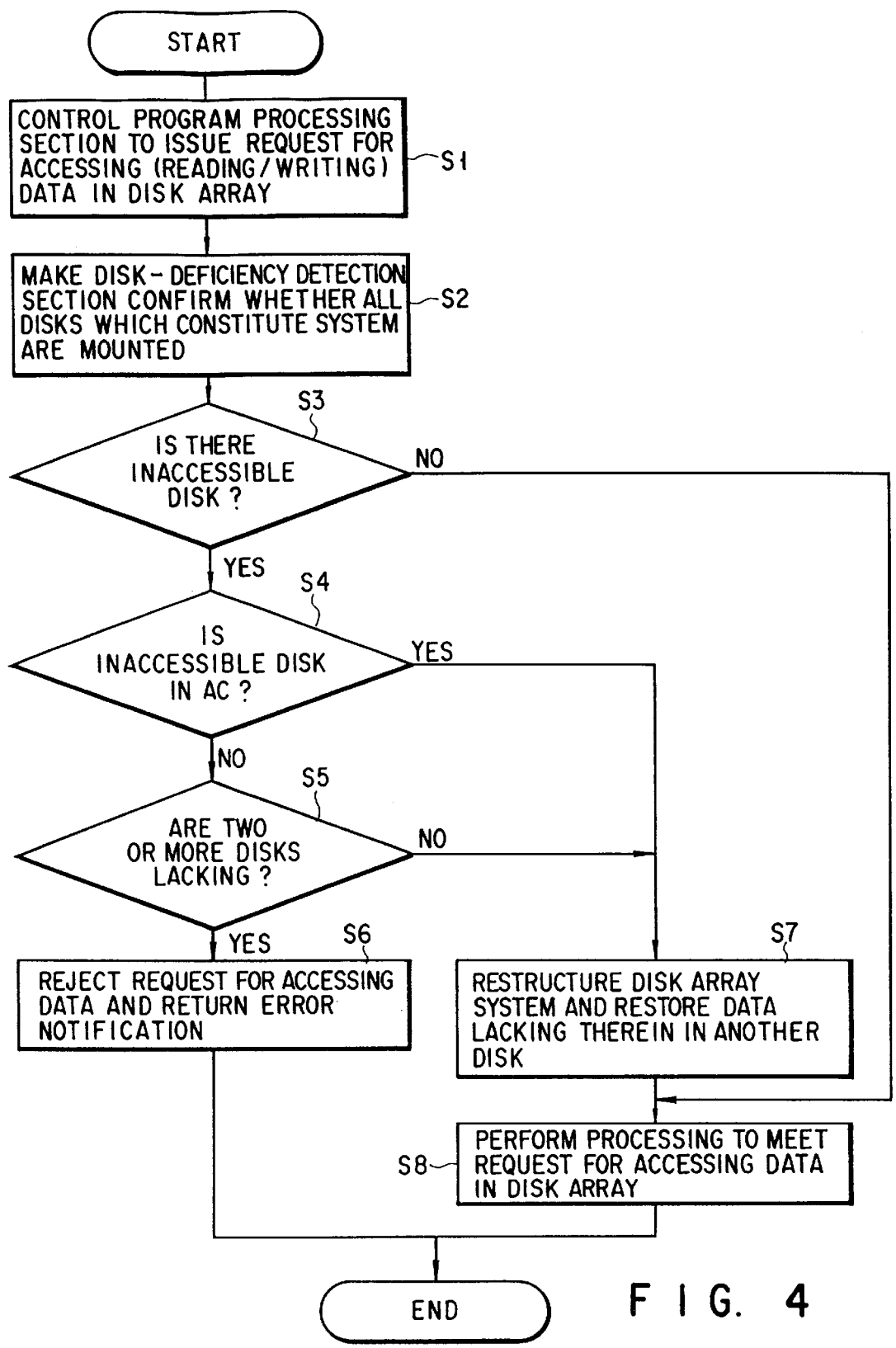
FIG. 4 is a flowchart, useful in explaining the operation of the data storage apparatus of the first embodiment.

The embodiments of the invention will be explained in detail with reference to the accompanying drawings.

In each of data storage apparatuses according to the first through tenth embodiments, predetermined ones of optical disks mounted therein are connected parallel to each other and constitute a single disk array.

A first embodiment will now be explained.

FIG. 1 is a schematic view, showing the structure of a data storage apparatus according to the first embodiment of the invention.

As is shown in FIG. 1, a program processing section 1 controls the overall apparatus. Specifically, the section 1 performs various processing on the basis of installed application programs so as to directly supply instructions to an input section 2, a memory management section 3 and a display section 4 mainly.

The input section 2 is constituted by a keyboard, etc. to be operated by the user to input various instruction data, etc.

The memory management section 3 manages the overall memory units in the apparatus.

The display section 4 displays the state of the apparatus, or a message for pressing the user for input of instruction data, etc.

With reference to disk array structure definition data stored in each optical disk, a disk array management section 5 manages the states and operations of first through fifth optical disk drives 9a–9e and a disk auto-changer 8 which stores optical disks (optical disk group) 10, and manages whether or not each of optical disks is mounted. Where any one of disks constituting a predetermined disk array cannot be accessed or found, a restoration section 17 restores data stored in that disk, thereby restructuring the disk array. The disk array management section 5 constructs a predetermined disk array determined by the memory management section 3.

A disk management table 6 shows data concerning optical disks used in the apparatus, which are stored in a memory area of a RAM.

Interface sections 7a–7e control, via the optical disk drives 9a–9e, reading of data from the optical disks and writing of data into them.

The disk auto-changer 8 manages the optical disk group 10 to mount and dismount the optical disks in and from the optical drives 9a–9e.

The optical disk drives 9a–9e write and read data into and from the respectively mounted optical disks.

A disk-deficiency detection section 11 detects, on the basis of a signal from the disk array management table 5, whether or not all the disks which constitute the predetermined disk array are contained in the apparatus.

FIG. 2 shows an example of the disk management table 6. As is shown in FIG. 2, the table 6 registers a disk identifier indicative of each optical disk; a mounting place where the optical disk is mounted; a temporary-deficiency flag which indicates that the optical disk is temporarily removed from the apparatus and the predetermined disk array lacks the disk (in FIG. 2, if the flag is "ON", the array temporarily lacks the disk, whereas if the flag is "OFF", the array does not lack the same), an identifier indicative of a substitutional disk which stores data restored when the disk array lacks the above optical disk; a write-prohibiting flag indicative of whether or not data can be written into the optical disk; and a detachment-prohibiting flag indicative of whether or not the optical disk may be removed from the apparatus.

For example, in FIG. 2, it is understood that an optical disk with an identifier 103 is now out of the apparatus, i.e. the disk array temporarily lacks the optical disk, and data restored in the apparatus and corresponding to the data stored in the optical disk is stored in a substitutional disk designated by an identifier 800. It is also understood that when the optical disk with the identifier 103 has been returned to the apparatus, writing data into the substitutional disk is prohibited, and removal of the same is prohibited.

First through fifth drives shown in FIG. 2 correspond to the optical disk drives 9a–9e, respectively.

Referring then to FIG. 3, disk array structure definition data stored in each optical disk will be explained.

FIG. 3 shows disk array structure definition data stored in an optical disk with an identifier 101. It is understood from FIG. 3 that a predetermined disk array including the optical disk with the identifier 101 further includes optical disks with identifiers 102, 103, 104 and 105.

How the disk array is constituted by each optical disk can be managed mainly on the basis of the disk identifier, the mounting place, the temporary-deficiency flag and the identifier assigned to the substitutional disk, which are included in the disk management table of FIG. 2, and the disk array structure definition data shown in FIG. 3.

For example, it is understood that the predetermined disk array is constituted by the five optical disks with the identifiers 101–105, and that the optical disk with the identifier 103 is temporarily removed from the apparatus. It is also understood that the data stored in the removed optical disk is restored in the optical disk with the identifier 800, and that the optical disk with the identifier 800 is currently mounted in the third drive (optical disk drive) 7c.

Referring then to the flowchart of FIG. 4, the operation of the data storage apparatus according to the first embodiment will be explained.

First, when in a step S1, the user instructs the apparatus to read or write predetermined data by operating the input section 2, the program processing section 1 issues a request for accessing (reading or writing) the predetermined data. This request is supplied to the memory management section 3, where it is determined which portion of the disk array, i.e. which optical disk included in the disk array is accessed. The determination result and the request issued by the program processing section 1 are also supplied to the disk array management section 5. The disk array management section 5, in turn, drives the disk auto-changer 8 to select an optical disk included in the predetermined disk array, from the optical disk group 10, and then to mount it in one of the optical disk drives 9a–9e. The determination result obtained in the memory management section 3 and the request issued by the program processing section 1 are also supplied to the disk-deficiency detection section 11.

Subsequently, the program proceeds to a step S2, where the detection section 11 makes a reference to the disk array management section 5 as to whether or not all the optical disks which constitute the disk array to be accessed are mounted in the optical disk drives 9a–9e. Then, the disk array management section 5 refers to disk array structure definition data prestored in each of the optical disks mounted in the drives 9a–9e, and also to the disk identifiers, the mounting places, etc. registered in the disk array management table 6, thereby checking which ones of the optical disks constituting the disk array exist, and notifying the disk-deficiency detection section 11 of the checking result.

If all the optical disks exist in the auto-changer 8 (step S3), the disk-deficiency detection section 11 determines that the disk array lacks no disks, and notifies the disk array management section 5 of it. Then, the program proceeds to a step S8.

In the step S8, the disk array management section 5 accesses the disk array.

On the other hand, if it is determined in the step S3 that there is an inaccessible optical disk, the disk-deficiency detection section 11 makes a reference to the disk array management section 5 as to whether or not the disk exists in the auto-changer 8 (step S4). If it is determined that the disk exists in the auto-changer 8, the disk is considered to be not usable, and the program proceeds to a step S7. If it is determined in the step S4 that the disk does not exist in the auto-changer 8, it is determined in a step S5 how many disks are missing from the array. If only the disk is missing, the program proceeds to the step S7.

In the step S7, the restoration section 17 restores data stored in the defective or removed optical disk, in a substitutional optical disk to restructure the disk array, thereby updating the data (an identifier assigned to the substitutional optical disk, etc.) in the disk management table 6. The program then proceeds to the step S8.

In other words, the restructuring of stored data is restoration, using parity data, of data lost as a result of either an abnormality or removal of a disk. For example, data can be stored in five optical disks by two methods. In one method, one of the five disks is dedicated to the parity data. In the other method, the parity data is dispersed over the five disks. If one of the disks becomes inaccessible for some reason, the lost data is restored on the basis of the remaining data and the parity data, and the restored data is stored in a new disk, thereby restructuring the original state.

If it is determined in the step S5 that the disk array lacks two or more optical disks, this means that restoration of data stored in these disks is not to be executed. In this case, the program proceeds to a step S6, where the disk array management section 5 updates the data in the disk management table 6 on the basis of the previous determination results, rejects the request for accessing, and supplies the program processing section 1 with a notification indicative of an error. Upon receiving the "error" notification, the program processing section 1 causes the display section 4 to display a message indicating that the data which the user wishes to access cannot be accessed.

As explained above, even when in the first embodiment, any one of optical disks included in a predetermined disk array is out of order or removed from the array, the data system can be restructured on the basis of a determination performed by the disk-deficiency detection section 11 using the disk management table 6 shown in FIG. 2 and the disk array structure definition data shown in FIG. 3. In other words, data stored in the defective or removed disk is restored in a substitutional disk, and the disk array management table is updated, with the result that the substitutional disk which stores the restored data can easily be managed by referring to the updated disk array management table.

A second embodiment of the invention will now be explained.

FIG. 5 is a schematic view, showing the structure of a data storage apparatus according to the second embodiment of the invention. Elements in FIG. 5 similar to those in FIG. 1 are denoted by corresponding reference numerals, and an explanation will be given only of a different element, i.e. a write permission-determining section 12 for permitting data to be written into a disk, which is also included in the disk array management section 5.

The write permission-determining section 12 determines, on the basis of a notification from the disk array management section 5, whether or not to permit data writing in optical disks mounted in the optical disk drives 9a–9e.

Figure 6:
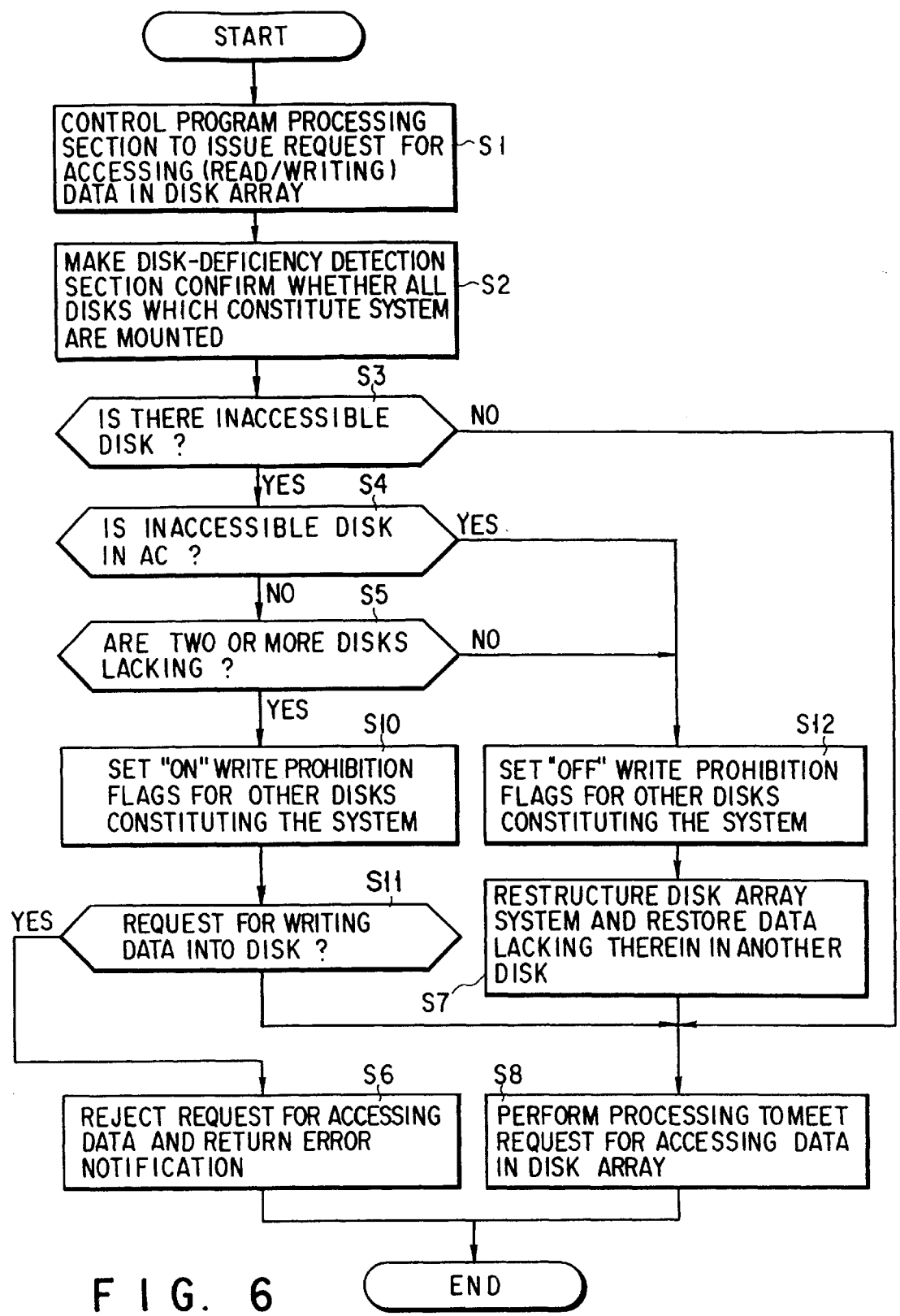
FIG. 6 is a flowchart, useful in explaining the operation of the data storage apparatus of the second embodiment.

Referring then to the flowchart shown in FIG. 6, the operation of the data storage apparatus of the second embodiment will be explained. Steps therein similar to those in FIG. 4 are denoted by corresponding reference codes, and an explanation will be given of different steps only. In the steps S1–S5, the same processing as in the corresponding steps in FIG. 4 is performed. If it is determined in the step S5 that only one optical disk is removed from the apparatus, the program proceeds to a step S12, whereas when two or more optical disks are removed therefrom, the program proceeds to steps S10 and S11.

In the step S10, the write permission-determining section 12 receives the message that two or more optical disks are removed from the apparatus, and performs the determination that writing data into all optical disks constituting a predetermined disk array and mounted in the optical disk drives 9a–9e should be prohibited. Upon receiving the determination of the write permission-determining section 12, the disk array management section 5 sets the write-prohibiting flag "ON" in the disk management table 6, followed by the program's proceeding to the step S11.

On the other hand, if the disk-deficiency management section 5 determines in the step S5 that only one of the optical disks which constitute the predetermined disk array is removed therefrom, the program proceeds to the step S12. In the step S12, the write permission-determining section 12 receives the message that only one optical disk is removed from the apparatus, and performs the determination that writing data into all optical disks constituting a predetermined disk array and mounted in the optical disk drives 9a–9e should be permitted. Upon receiving the determination of the write permission-determining section 12, the disk array management section 5 sets the write-prohibiting flag "OFF" in the disk management table 6, followed by the program's proceeding to the step S7.

If it is determined in the step S11 that a request to read data is issued by the program processing section 1, the program proceeds to the step S8, where the disk array management section 5 performs processing for reading data. If, on the other hand, it is determined that a request to write data is issued by the program processing section 1, the program proceeds to the step S6.

As explained above, in the second embodiment, the disk-deficiency detection section 11 performs a determination on the basis of the disk management table 6 as shown in FIG. 2 and the disk array structure definition data stored in each optical disk as shown in FIG. 3. Where the determination indicates that two or more of the optical disks which constitute a predetermined disk array are removed from the apparatus, the write permission-determining section 12 determines that writing data into all optical disks constituting the predetermined disk array and mounted in the optical disk drives 9a–9e should be prohibited. Upon receiving the determination of the write permission-determining section 12, the disk array management section 5 sets the write-prohibiting flag "ON" in the disk management table 6, thereby permitting reading of data only. By virtue of this structure, where the predetermined disk array is restructured by restoring data stored in the removed optical disks, in other unused optical disks serving as substitutional disks, when the removed disks are returned to the apparatus, management of the restored data can be performed simply by deleting the data stored in the substitutional disks. Thus, the reliability of management of data stored in a plurality of optical disks is enhanced.

A third embodiment of the invention will be explained.

A data storage apparatus according to the third embodiment has the same structure as the apparatus shown in FIG. 1.

Referring to the flowcharts of FIGS. 4 and 7, the operation of the apparatus of the third embodiment will be explained.

Figure 7:
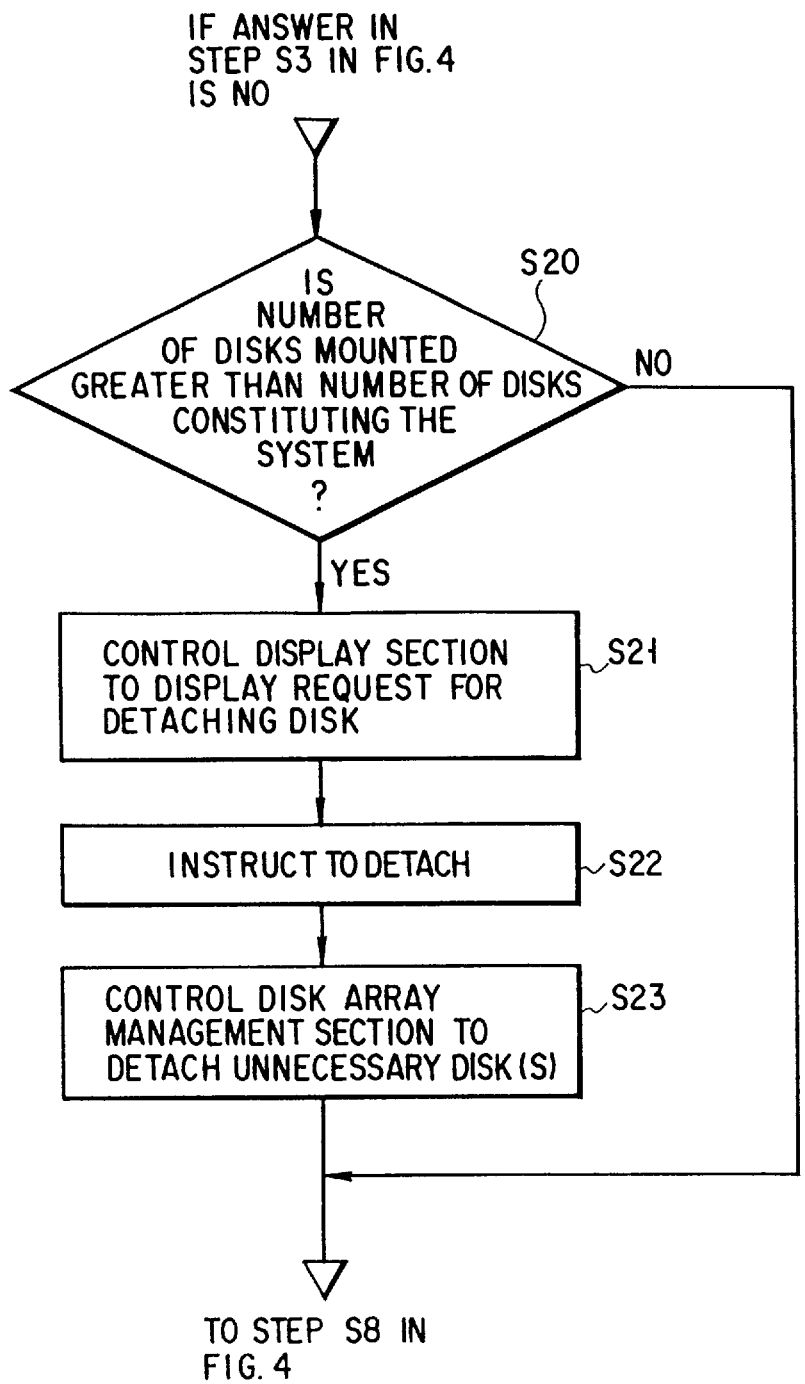
FIG. 7 is a flowchart, useful in explaining the operation of a data storage apparatus according to a third embodiment.

If it is determined by the disk-deficiency detection section 11 in the step S3 of FIG. 4 that all optical disks are mounted, the program proceeds to a step S20 in FIG. 7.

If in the step S20, the disk-deficiency detection section 11 determines, on the basis of data supplied from the disk array management section 5, that the number of optical disks mounted in the optical disk drives 9a–9e is larger than that of the optical disks which constitute the disk array, it notifies the program processing section 1 of the determination and the identifier, etc. of each unnecessary disk, followed by the program's proceeding to a step S21.

In the step S21, the program processing section 1 controls the display section 4 to display the identifier of the unnecessary optical disk and a message for requesting removal of the disk. When the user inputs, by operating the input section 2, an instruction to remove the unnecessary optical disk on the basis of the data displayed on the display section 4 (step S22), the program processing section 1 receives the instruction and controls the disk array management section 5 so as to remove the disk from a corresponding disk drive and make the disk auto-changer 8 retreat (step S23). Then, the program returns to the step S8 of FIG. 4.

As explained above, if in the third embodiment, the disk-deficiency detection section 11 detects that the number of the optical disks exist in the optical disk drives 9a–9e is larger than that of the optical disks which constitute the disk array, a request to remove the unnecessary disk is issued to the user. The user, in turn, removes the unnecessary disk from the apparatus, thereby enhancing the reliability of the management of data stored in the optical disks.

A fourth embodiment of the invention will be explained.

Figure 8:
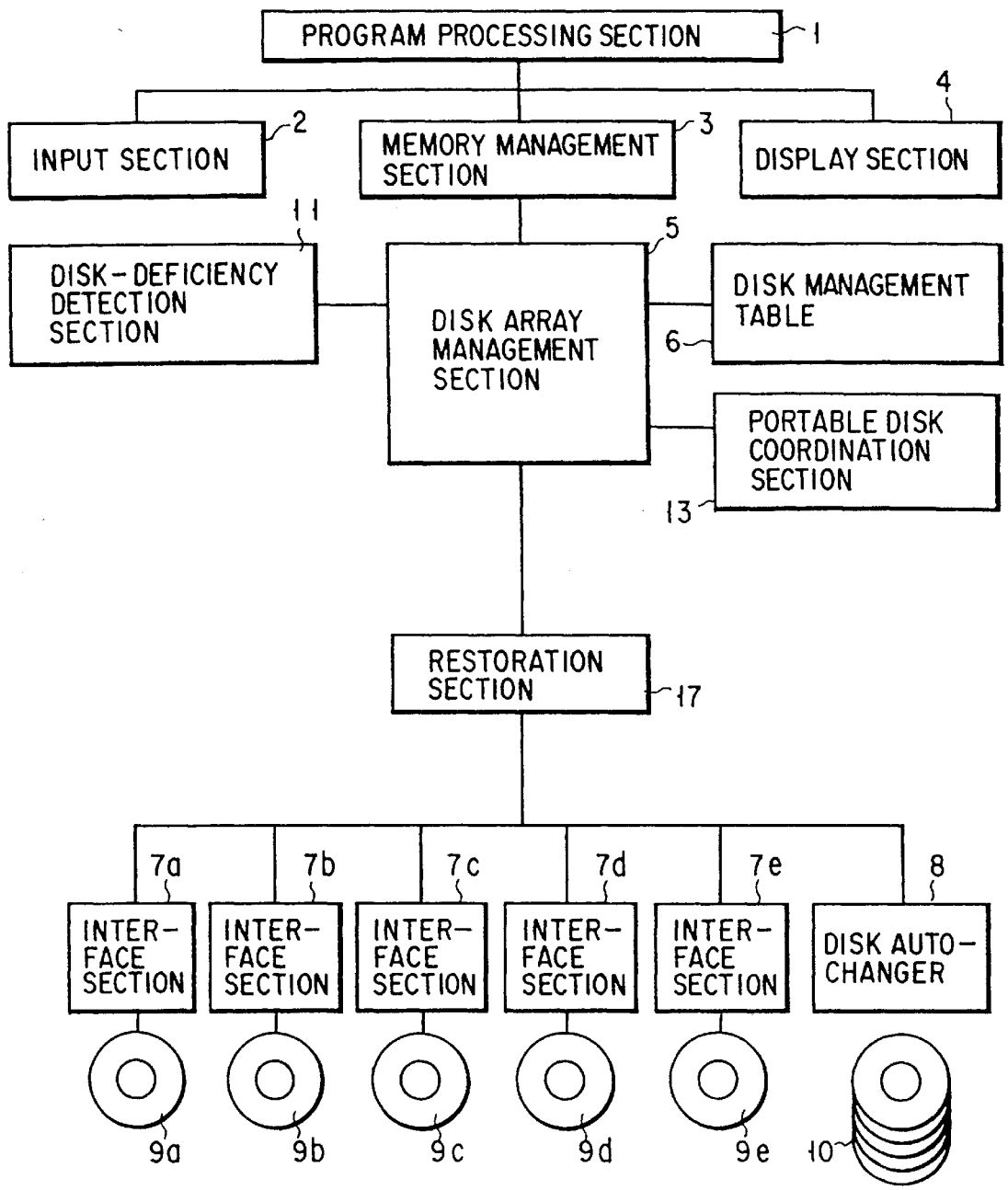
FIG. 8 is a schematic view, showing the structure of a data storage apparatus according to a fourth embodiment of the invention.

FIG. 8 is a schematic view, showing a data storage apparatus according to the fourth embodiment. Concerning the apparatus of FIG. 8, elements similar to those in FIG. 1 are denoted by corresponding reference numerals, and no detailed explanations will be given of them. In this case, the disk array management section 5 further includes a removable disk coordination section 13 for coordinating the contents (i.e. the restored data) of a substitutional optical disk with those of an original optical disk which is temporarily removed from the apparatus and to be returned thereto.

There are three coordination methods. In a first one, the contents of an original optical disk removed from the apparatus are copied in a substitutional optical disk, and are all erased (i.e. the original optical disk is initialized) when the original disk is returned. In a second one, the contents of the original optical disk removed from the apparatus are copied in a substitutional optical disk, and the contents of the substitutional optical disk are all erased (i.e. the substitutional optical disk is initialized) when the original disk is returned. In a third one, neither the original nor the substitutional optical disks is initialized, and both of them are removed from the apparatus with the data of the substitutional disk stored in the disk management table 6.

Figure 9:
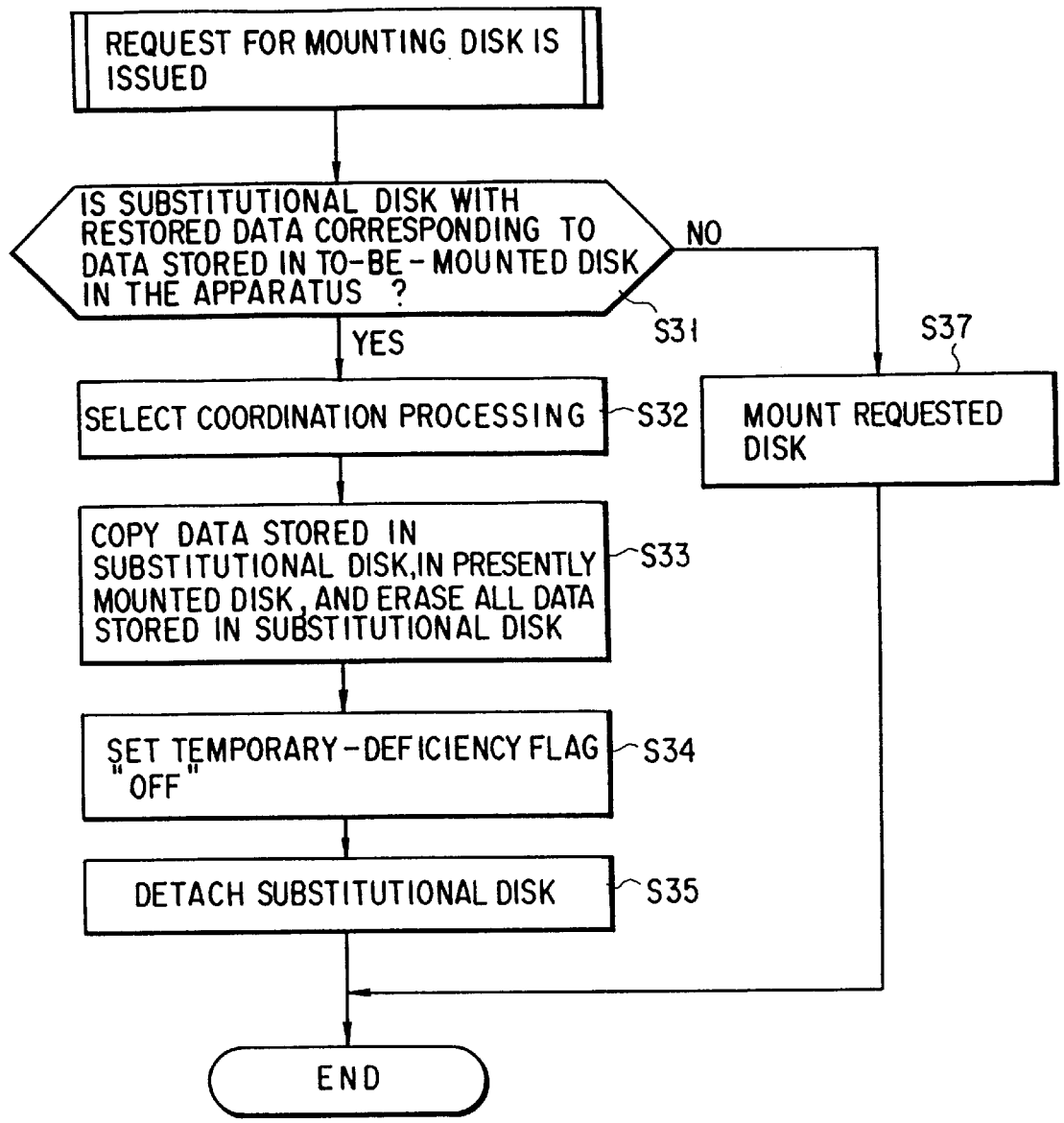
FIG. 9 is a flowchart of a subroutine, useful in explaining the operation of the data storage apparatus of the fourth embodiment.

Referring then to the flowchart of FIG. 9, the operation of the data storage apparatus of the fourth embodiment will be explained.

When the user has instructed, by operating the input section 2, to mount (return) a predetermined optical disk, the program processing section 1 responds to the instruction and issues a request for mounting (returning) the optical disk.

The request is supplied to the memory management section 3. The memory management section 3, in turn, determines the disk array which includes the to-be-returned optical disk, and which portion of the disk array corresponds to the to-be-returned optical disk. The determination result of the section 3 and the request of the program processing section 1 are also supplied to the disk array management section 5.

On the basis of the determination result of the memory management section 3, the disk array management section 5 determines, with reference to the disk management table 6, whether or not there is a substitutional disk wherein the contents of the disk requested to be returned are restored (step S31).

If it is determined that there is no substitutional disk, the program processing section 1 is notified of the determination result, and controls the display section 4 so as to display a message requesting that the user should mount the to-bereturned disk. When the user has mounted the disk, the disk array management section 5 updates the disk management table 6 (specifically, sets the mounting place of the disk, and the temporarily-deficiency flag "OFF"), followed by the termination of the processing (step S37).

If, on the other hand, it is determined in the step S31 that there is a substitutional disk, the program processing section 1 is notified of it, and controls the display section 4 so as to display a message requesting that the user should select one of the first through third coordination methods (step S32). Then, the program proceeds to a step S33.

In the step S33, coordination processing is performed by the selected one of the coordination methods. More specifically, the coordination method selected by the user via the input section 2 is notified of from the program processing section 1 to the disk array management section 5, and coordination processing is performed by the removable disk coordination section 13 using the selected coordination method. If the user selects the second coordination method, the section 13 copies the contents of the substitutional optical disk in the returned original optical disk, and then initializes the substitutional disk.

Thereafter, the program proceeds to a step S34, where the disk array management section 5 sets "OFF" the temporarily-deficiency flag dedicated to the returned original optical disk in the disk management table 6.

Moreover, when the user has removed the substitutional optical disk from the apparatus, the disk array management section 5 updates the disk management table 6 (for example, the mounting place of the removed optical disk is set to "outside the apparatus", and the temporarily-deficiency flag dedicated to the removed optical disk is set "ON"), thereby terminating the processing (step S35).

If in the step S33, the user selects the first coordination method, the removable disk coordination section 13 copies the contents of the original optical disk in a substitutional optical disk, and initializes the original optical disk.

Then, the program proceeds to the step S34, where the disk array management section 5, for example, replaces the identifier indicative of the substitutional optical disk with that indicative of the original optical disk, and sets the temporarily-deficiency flag "OFF".

Further, when the user has removed the original optical disk, the disk array management section 5 updates the disk management table 6 (for example, the mounting place of the removed optical disk is set to "outside the apparatus", and the temporarily-deficiency flag dedicated to the removed optical disk is set "ON"), thereby terminating the processing (step S35).

If in the step S33, the user selects the third coordination method, the removable disk coordination section 13 does not initialize both the original and substitutional optical disks. The program skips over the step S34 to the step S35. When the user has removed the original and substitutional optical disks, the disk array management section 5 updates the disk management table 6 (the mounting places of the removed optical disks are set to "outside the apparatus", and the temporarily-deficiency flags respectively dedicated to the removed optical disks are set "ON"), thereby terminating the processing (step S35).

As explained above, at the time of returning a temporarily removed original optical disk to the data storage apparatus in the fourth embodiment, if there is a substitutional optical disk in the apparatus, coordination processing concerning the contents of the original optical disk and those of the substitutional optical disk is performed by a coordination method selected by the user. Thereafter, one or both of the original and substitutional disks are removed from the apparatus. In particular, since in the case of the first and second coordination methods, a plurality of optical disks which constitute a predetermined disk array are managed such that none of the disks has a duplicate in the apparatus, data restored when an optical disk has been removed from the apparatus can easily be managed. This means that the apparatus can manage data stored in the optical disks with high reliability.

A fifth embodiment will now be explained.

A data storage apparatus according to the fifth embodiment has the same structure as the apparatus shown in FIG. 1.

The operation of the data storage apparatus of the fifth embodiment will be explained on the basis of the operation of the third embodiment explained with reference to the flowcharts of FIGS. 4 and 7. The operation performed in the steps S1–S3 of FIG. 4 by the apparatus of the fifth embodiment is similar to that of the third embodiment. In the fifth embodiment, however, the program proceeds to the step S8 of FIG. 4 where a predetermined disk array is accessed, only if it is determined in the step S3 of FIG. 4 that all the optical disks which constitute the predetermined disk array exist in the auto-changer 8, and if it is determined in the step S7 of FIG. 7 that there is no unnecessary optical disk.

If the above conditions are not satisfied, the program proceeds to the step S6 of FIG. 4, where access to data is prohibited and an error notification is issued.

As described above, in the fifth embodiment, the optical disks which constitute the predetermined disk array are managed such that none of the disks has a duplicate in the apparatus. Accordingly, even where an optical disk is removed from the apparatus, data stored in the removed disk can be reliably managed.

A sixth embodiment will be explained.

FIG. 10 is a schematic view, showing a data storage apparatus according to a sixth embodiment. Elements in FIG. 10 similar to those in FIGS. 1 and 8 are denoted by corresponding reference numerals, and an explanation will be given of different elements only. The data storage apparatus shown in FIG. 10 comprises a removable disk removal permission-determining section 14 and a system restructuring reason-judging section 15, as well as the disk array management section 5 (FIG. 1) and the removable disk coordination section 13 (FIG. 8).

If a predetermined disk array lacks only one of the optical disks included therein and if the disk is temporarily removed from the apparatus, the removable disk removal permission-determining section 14 determines to prohibit the removal of a corresponding substitutional optical disk so long as the removed disk is not returned to the apparatus.

Where the predetermined disk array lacks only one of the optical disks included therein, the system restructuring reason-judging section 15 determines, on the basis of data input by the user through the input section 2, whether or not the of lacking the optical disk state is only temporary.

Figure 11:
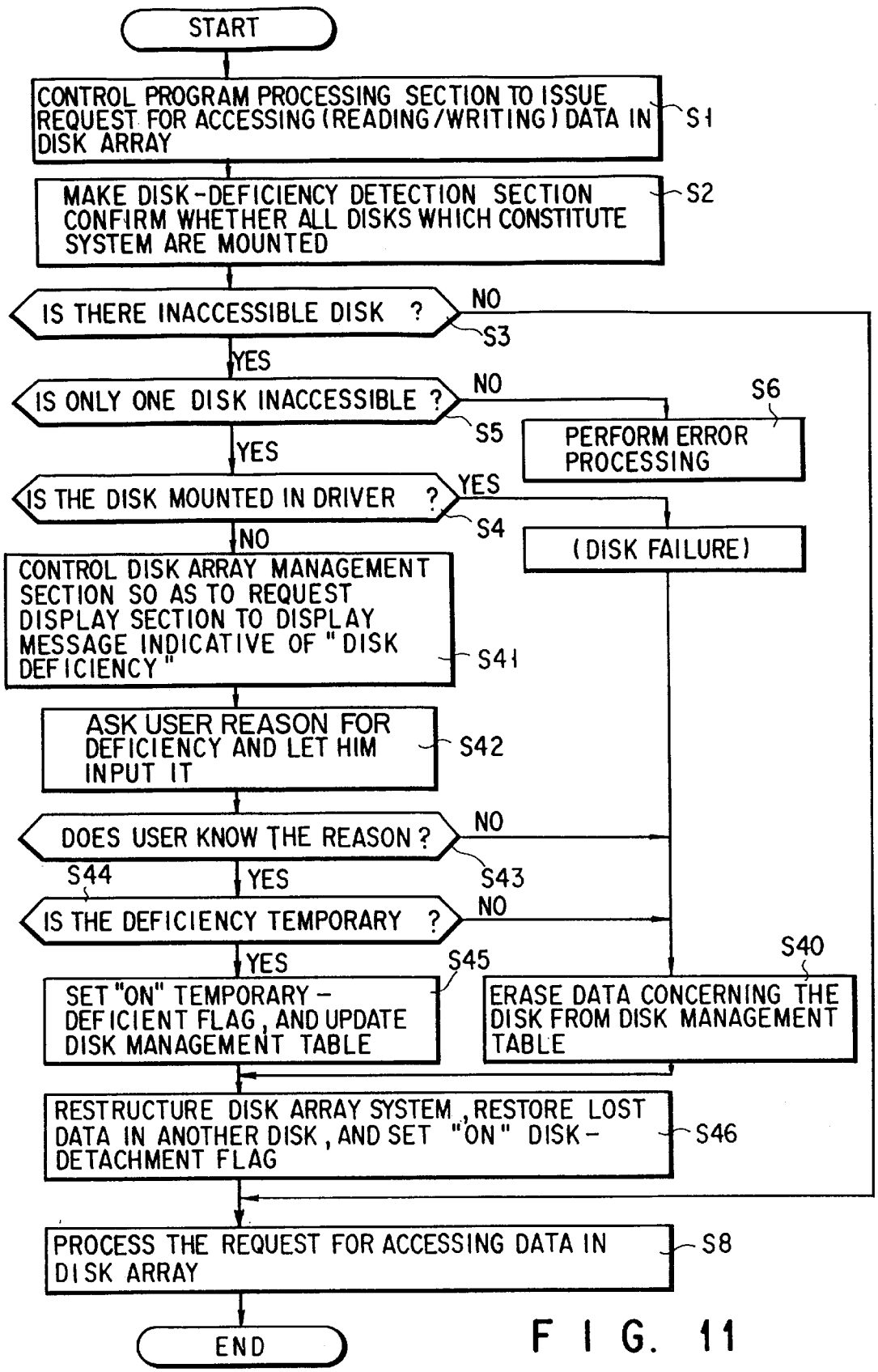
FIG. 11 is a flowchart, useful in explaining the operation of the data storage apparatus of the sixth embodiment.

Referring to the flowchart of FIG. 11, an explanation will be given of the operation of the data storage apparatus of the sixth embodiment performed when a predetermined disk array is accessed. In FIG. 11, steps similar to those in FIG. 4 are denoted by corresponding reference signs, and only different steps will be explained.

Where all the optical disks constituting a predetermined disk array which the user requests to access exist in the auto-changer 8, the same operations as in the steps S1–S3 and S8 in FIG. 4 are performed in the steps S1–S3 and S8 in FIG. 11.

If it is determined in the step S3 of FIG. 11 that there is an inaccessible optical disk, the program proceeds to the step S5. If it is determined in the step S5 that there are two or more inaccessible optical disks, the program proceeds to the step S6, where the request for access is rejected and an error notification is supplied to the program processing section 1.

If it is determined in the step S4 of FIG. 11 that only one optical disk is inaccessible, the program proceeds to the step S4, where the disk deficiency detection section 11 determines whether or not the inaccessible disk exists in the auto-changer 8. If the inaccessible disk exists in the auto-changer 8, the disk itself is considered defective. The disk array management section 5 is notified of the fact, and the program proceeds to a step S40.

In the step 40, the disk array management section 5 erases data concerning the inaccessible optical disk from the disk management table 6. The program proceeds then to the steps S46 and S8, where data stored in the inaccessible optical disk is restored in a substitutional optical disk by means of the restoration section 17, thus restructuring the disk array and accessing to-be-accessed data.

If it is determined in the step S4 by the disk-deficiency detection section 11 that the inaccessible optical disk does not exist in the auto-changer 8, the disk array management section 5 is notified of the determination result, followed by the program's proceeding to a step S41.

In the step S41, the disk array management section 5 supplies the display section 4 with an instruction to display a message indicating that the disk array lacks the optical disk, followed by the program's proceeding to a step S42.

In the step S42, the disk array management section 5 controls the display section 4 so as to display a message requesting that the user should notify through the input section 2 whether or not the optical disk is temporarily removed from the apparatus.

If the system restructuring reason-judging section 15 determines, on the basis of data input by the user's operation of the input section 2, that the user does not know the reason why the optical disk is reasoned (step S43), or that the state of lacking the optical disk is not temporary (step S44), the disk array management section 5 considers that the optical disk is out of order, followed by the program's proceeding to the step S40.

If, on the other hand, it is determined in the step S43 that the state of lacking the optical disk is only temporary, the program proceeds to a step S45, where the disk array management section 5 updates the disk management table 6 and sets "ON" the temporary-deficiency flag for the optical disk.

Thereafter, the program proceeds to a step S46, where the disk array management section 5 controls the restoration section 17 so as to restore data lacking in a substitutional optical disk, thereby restructuring the predetermined disk array. Subsequently, the section 5 registers the identifier of the removed optical disk as that of the substitutional optical disk corresponding thereto, and sets "ON" the detachment-prohibiting flag for the substitutional disk, followed by the program's proceeding to the step S8 to perform data access.

Figure 12:
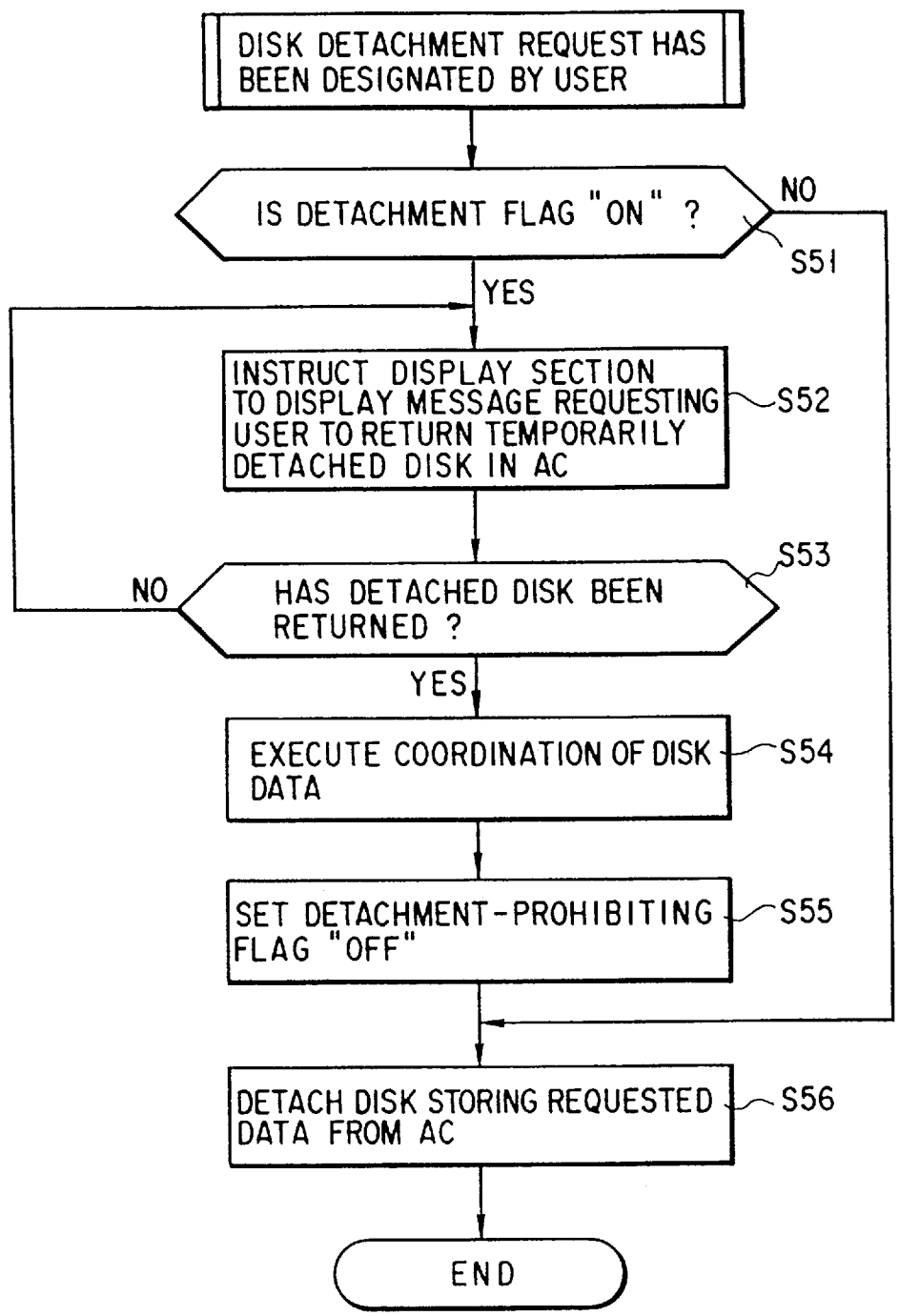
FIG. 12 is a flowchart of a subroutine, useful in explaining the operation of the data storage apparatus of the sixth embodiment.

Referring then to the flowchart of FIG. 12, an explanation will be given of the operation of the data storage apparatus of the sixth embodiment performed when a request for removing the substitutional disk which stores the restored data has been issued.

When, for example, the user has instructed, through the input section 2, to remove the substitutional disk, the program processing section 1 issues a request for removing the same.

Upon receiving the request for removing the substitutional disk, the memory management section 3 determines which optical disk corresponds to the substitutional disk. The determination result is supplied to the disk array management section 5, together with the request for removing the same.

The disk array management section 5 determines whether a detachment-prohibiting flag for the optical disk is "ON" or "OFF". If the flag is "OFF" (step S51), the program proceeds to a step S56, where the optical disk to be removed is dismounted from the disk auto-changer 8.

If, on the other hand, the detachment-prohibiting flag is "ON" in the step S51, the program proceeds to a step S52, where the disk array management section 5 refers to the disk management table 6 to determines an original optical disk corresponding to the substitutional disk requested to be detached, i.e. a temporarily removed optical disk. Further, the disk array management section 5 controls the display section 4 via the program processing section 1 so as to display a message requesting that the original optical disk should be mounted. The display section 4, in turn, displays the message.

If the disk array management section 5 detects that the user has mounted the original optical disk (step S53), it performs coordination processing concerning the contents of the original and constitutional optical disks (step S54). In this case, for example, the above-described second coordination method is used. Specifically, the contents of the substitutional optical disk are copied to the original optical disk, and then erased.

After the coordination processing, the program proceeds to a step S55, where the detachment-prohibiting flag is set "OFF" in the disk management table 6, as regards all the optical disks which constitute the disk array and include the optical disk requested to be detached.

Subsequently, the program proceeds to a step S56, where the designated disk (i.e. the substitutional disk after coordination processing is performed using the second coordination method) is removed from the auto-changer 8.

As explained above, where only one of optical disks constituting a predetermined disk array is temporarily unavailable in the sixth embodiment, data stored in the temporarily removed optical disk is restored. However, in this case, control is performed using the detachment-prohibiting flag in the disk management table 6, so as to prohibit the removal of a substitutional optical disk corresponding to the temporarily removed disk unless the removed disk is returned to the apparatus and coordination processing is performed regarding the contents of the removed disk and the substitutional disk. By virtue of this control, none of the optical disks of the predetermined disk array has its duplicate in the apparatus, thereby avoiding confusing management of the optical disks in the apparatus.

A seventh embodiment of the invention will be explained.

Figures 13, 14:
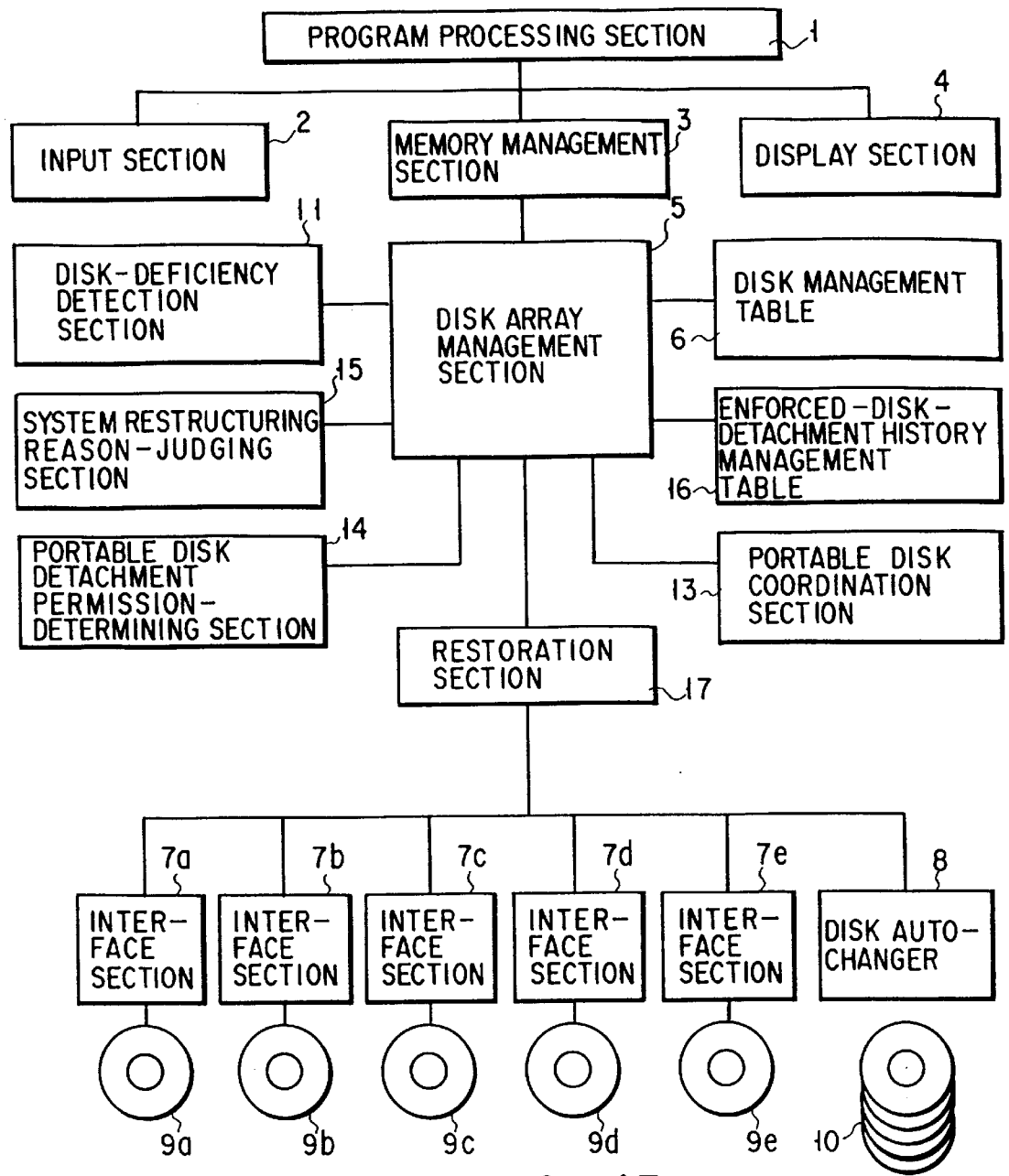
FIG. 13 is a schematic view, showing the structure of a data storage apparatus according to a seventh embodiment of the invention.
FIG. 14 is a view, showing an example of a record stored in a forced-disk-detachment history management table.

FIG. 13 is a schematic view, showing the structure of a data storage apparatus according to the seventh embodiment. Elements in FIG. 13 similar to those in FIG. 10 are denoted by corresponding reference numerals, and an explanation will be given only of a different element, i.e. an enforced-disk-detachment history management table 16 which is also included in the disk array management section 5.

The enforced-disk-detachment history management table 16 is stored, for example, in a memory area of the RAM, for recording therein the history of an optical disk whose removal is prohibited by the detachment-prohibiting flag, but which has been forcedly removed as a result of designation by the user.

FIG. 14 shows an example of a record stored in the forced-disk-detachment history management table.

As is shown in FIG. 14, the table 16 records the identifier of an optical disk forcedly detached, the time and date of the forced detachment, and the name of a user who removed the optical disk.

Referring then to the flowchart of FIG. 16, the operation of the data storage apparatus of the seventh embodiment performed when a request for removing an optical disk occurs will be explained.

When the user instructs the apparatus to mount therein a predetermined optical disk, using the input section 2, the program processing section 1 issues a request for mounting the optical disk.

Upon receiving the request via the memory management section 3, the disk array management section 5 refers to the enforced-disk-detachment history management table 16 to determine whether or not the identifier of the optical disk requested to be mounted is recorded (step S60).

If it is determined in the step S60 that the identifier is not recorded, the program proceeds to a step S63, where processing for mounting the optical disk is performed.

If, on the other hand, it is determined in the step S60 that the identifier is recorded, then it is determined that the optical disk has been forcedly removed irrespective that the removal of the disk is prohibited. The determination result is supplied to the program processing section 1, which in turn instructs the display section 4 to display a message requesting that the forcedly removed optical disk should be mounted, in order to perform coordination processing concerning the optical disk (step S61).

Then, the disk array management section 5 sets "ON" the detachment-prohibiting flag stored in the disk management table 6 and dedicated to the forcedly removed optical disk (step S62), and executes processing for mounting the forcedly removed optical disk (step S63). Further, when the forcedly removed optical disk has been mounted, a warning may be issued.

Thereafter, when an optical disk necessary for coordination, such as a temporarily removed optical disk, a substitutional optical disk for compensating for the temporarily removed disk, etc. has been mounted, the removable disk coordination processing section 13 performs coordination processing.

As explained above, where a substitutional optical disk for compensating for a temporarily removed optical disk (original disk), which is managed as a detachment-prohibited disk by the disk management table 6, is forcedly detached, it is necessary, at the time of returning the forcedly removed substitutional disk, to perform coordination between the substitutional disk and, for example, the original disk which is once removed and may be returned. In light of this, in the seventh embodiment, such an optical disk as has been forcedly removed and must be subjected to coordination processing is recorded in the enforced-disk-detachment history management table 16, thereby enabling the management of the history, etc. of each of optical disks which constitute a disk array.

An eight embodiment of the invention will be explained.

A data storage apparatus according to the eight embodiment has the same structure as the apparatus shown in FIG. 1.

The apparatus of the eight embodiment differs from the FIG. 1 apparatus in that the disk-deficiency detection section 11 operates in a different manner therebetween. In this embodiment, the disk-deficiency detection section 11 always monitors the temporary-deficiency flag in the disk management table 6, and sets the flag "OFF" if the flag is kept "ON" for more than a predetermined period of time. The predetermined time period from the time when the temporary-deficiency flag is set "ON", to the time when the flag is set "OFF" can be voluntarily changed by the user.

As described above, in the eight embodiment, the disk array management section 11 always monitors the temporary-deficiency flag in the disk management table 6 so that the flag will not be kept "ON" for more than a predetermined period of time. As a result, the disk array is prevented from temporarily lacking a large number of optical disks, and accordingly the number of optical disks which must be included in the apparatus can be reduced.

Moreover, the above operation of the disk-deficiency detection section 11 can notify the user of a specific time limit for the "temporary deficiency", which enables perfect management of the optical disks.

A ninth embodiment will be explained. An apparatus according to the ninth embodiment is a combination of the first, the sixth, the seventh and the fourth embodiments, and has the same structure as that shown in FIG. 8.

The operation of the apparatus of the ninth embodiment will be explained in detail.

Suppose that a certain one of optical disks which constitute a predetermined disk array is removed from the apparatus. This certain one disk will be referred to as a "first optical disk".

When the user requests, by operating the input section 2, to access the predetermined disk array, the temporary-deficient flag for the first optical disk in the disk management table 6 is set "ON" as explained in the sixth embodiment, since only the first optical disk included in optical disks which constitute the predetermined disk array requested to be accessed is temporarily removed (see the explanation concerning the steps S1–S5 of FIG. 4). Subsequently, data lacking in the disk array is restored in a substitutional optical disk (hereinafter referred to as a "second optical disk") thereby restructuring the predetermined disk array. Then, the detachment-prohibiting flag for the second optical disk in the table 6 is set "ON", and processing for accessing the restructured disk array is executed (see the explanation concerning the steps S45, S46 and S8 of FIG. 11).

Figure 15:
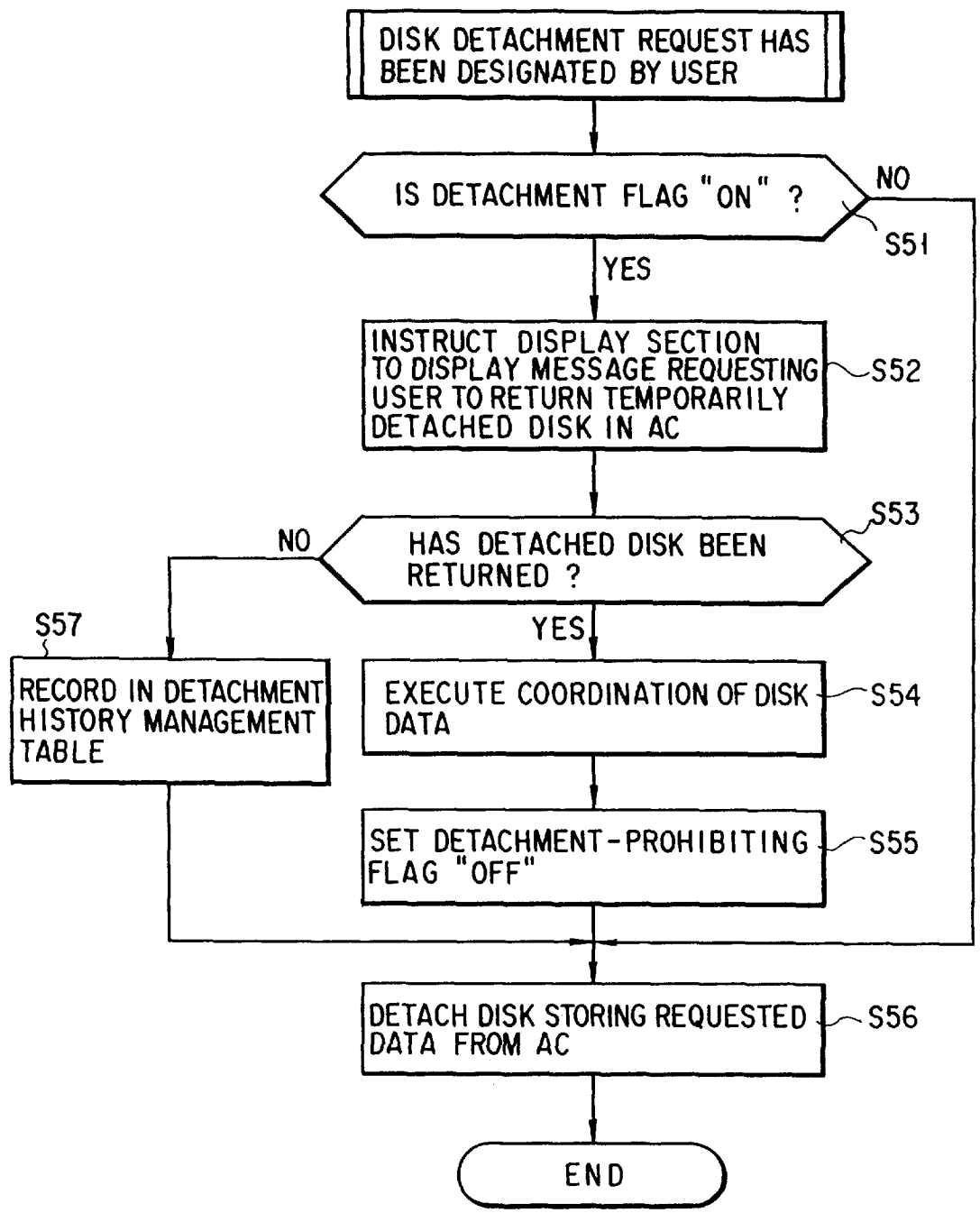
FIG. 15 is a flowchart of a subroutine, useful in explaining the operation of the data storage apparatus of the seventh embodiment.

When, as described above, a request for removing the second optical disk, whose removal is prohibited by the detachment-prohibiting flag, is issued, processing is executed in accordance with the steps of FIG. 15 employed in the seventh embodiment. In other words, the history of the second optical disk is recorded in the enforced-disk-detachment history management table 16, and then the disk is detached.

Thereafter, at the time of returning the first and second optical disks to the apparatus, processing is executed in accordance with the steps employed in the fourth embodiment. For example, all the contents of the second optical disk are copied in the first optical disk, then coordination processing for initializing the second optical disk is executed, and the first optical disk is mounted in the apparatus and used as a part of the disk array (see the explanation concerning the flowchart of FIG. 9).

FIG. 17 is a view, useful in explaining a data storage apparatus network according to a tenth embodiment. The network shown in FIG. 17 includes the program processing section 1, the input section 2, the memory management section 3, the display section 4, the disk array management section 5, the disk management table 6, the disk-deficiency detection section 11, and the restoration section 17 as in the first embodiment shown in FIG. 1. However, the tenth embodiment differs from the first embodiment in that the disks 9a–9e are dispersedly mounted in a plurality of disk driving apparatuses installed, for example, in respective working sections of a company, and are connected to each other via the data bus 18. Further, this network is connected to image pickup apparatuses 21–24, such as a digital copy machine, a facsimile, etc., which serve as data input means. Picked image data is transmitted through a bus line and stored in an optical disk as a storage device.

By virtue of the above structure, if data stored in one (e.g. disk 9a) of the disks is lost, it can be restored by the data restoring function of the disk array so long as data remain in the disks placed in sections different from that of the disk 9a.

If each optical disk in the system is managed by a corresponding operator, data stored in the system can be managed in a highly reliable manner. This is because the data cannot be accessed unless that number of operators gather in a company, which is equal to or smaller only by one than the number of all the optical disks of the system.

In the first through tenth embodiments, whether or not each optical disk exists in the data storage apparatus is managed using the disk management table 6, and the table 6 is referred to at the time of accessing a predetermined disk array so as to detect an optical disk which the disk array lacks, thereby restructuring the disk array as a result of restoring, by means of a restoration section, the contents of the optical disk removed from the disk array. Further, removal of a substitutional optical disk for compensating the is removed original optical disk is prohibited using the detachment-prohibiting flag in the disk management table 6, until the original optical disk is returned. At the time of returning the removed original optical disk, coordination between the substitutional optical disk and the original optical disk is performed. The above-described operations prevent duplication of data stored in a recording medium (such as an optical disk) installed in the data storage apparatus, and data restored when the medium (which is not defective) is temporarily removed or lost. Accordingly, management of data is facilitated, and the reliability of the data is enhanced.

As regards the first through eighth embodiments, they can be combined with each other. In this case, it suffices if the management data and/or the control data (the write-prohibiting flag; the detachment-prohibiting flag) in the disk management table 6 are used appropriately.

In summary, the present invention provides a data storage apparatus which includes a plurality of removable recording mediums connected parallel to each other and constituting a disk array, and can avoid coexistence of original data stored in each recording medium and data restored when the apparatus lacks the original data not because of failure of the medium but because of temporary removal or missing of the same, thereby facilitating the management of data and enhancing the reliability of data.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A data processing apparatus comprising:
   holding means for removably holding a plurality of removable storage media;
   accessing means for accessing a first removable storage medium of the plurality of removable storage media so as to read the data stored therein;
   detecting means for detecting whether a second removable storage medium of the plurality of removable storage media changed from being accessible to inaccessible or from being inaccessible to accessible;
   means for storing data the storing means being other than the second removable storage medium;
   restoration means for accessing the removable storage media held by the holding means other than the second removable storage medium when the detecting means has detected that the second removable storage medium changed from being accessible to inaccessible, so as to read part of data stored in each of the accessed removable storage media, thereby creating a copy of the data stored in the second removable storage medium and causing the copy of the data to be stored in the storing means;
   means for reading the data stored in the second removable storage medium when the detecting means has detected that the second removable storage medium changed from being inaccessible to accessible;
   means for comparing the data read by the reading means with the copy of the data stored in the storing means; and
   means for performing control so as to prohibit access to the removable storage media when a number of the removable storage media has increased or decreased.

2. A data processing apparatus according t claim 1, wherein the holding means includes second storage means for storing the copy of the data created by the restoration means into a third removable storage medium.

3. A data processing apparatus according to claim 2, wherein the second storage means includes:
   means for maintaining the data stored in the second removable storage medium as it is, and initializing a memory area of the third removable storage medium, when the second removable storage medium has become accessible again.

4. A data processing apparatus according to claim 2, wherein the second storage means includes:
   means for initializing a memory area of the second removable storage medium, and maintaining the data stored in the third removable storage medium as it is, when the second removable storage medium has become accessible again.

5. A data processing apparatus according to claim 1, wherein the holding means includes means for holding a plurality of optical disks and rotating the disks at a predetermined speed.

6. A data processing apparatus according to claim 1, wherein the restoration means includes:
   means for creating parity data on the basis of data held in the removable storage media, and storing the parity data in the removable storage media; and
   means for creating the copy of the data stored in the second removable storage medium, on the basis of the parity data stored in the removable storage media other than the second removable storage medium.

7. A data processing apparatus according to claim 1, further comprising:
   means for preventing the accessing means from accessing for data storing when the detection means has detected a plurality of inaccessible ones in the removable storage media.

8. A data processing apparatus according to claim 1, further comprising:
   means for detecting an unnecessary one of the removable storage media; and
   means for removing the detected unnecessary removable storage medium from the holding means.

9. A data processing apparatus according to claim 1, wherein the restoration means includes:
   means for setting a predetermined flag "ON" when one of the removable storage media has become inaccessible; and
   means for setting the predetermined flag "OFF" when a predetermined period of time has passed after the predetermined flag is set "ON".

10. A data processing apparatus according to claim 1, wherein the holding means includes:
    a plurality of interfaces provided for the removable storage media, respectively; and
    a bus line interposed between the interfaces.

11. A data processing apparatus comprising:
    means for removably holding a plurality of removable storage media;
    means for accessing a first removable storage medium which is one of the removable storage media so as to read the data stored therein;
    means for detecting whether a second removable storage medium, which is one of the removable storage media, is inaccessible or accessible;
    restoration means for accessing the removable storage media held by the holding means other than the second removable storage medium when the detection means has detected the second removable storage medium inaccessible, so as to read part of data stored in each of the accessed removable storage media, thereby restoring the data stored in the second removable storage medium; and
    comparison means for reading the data stored in the second removable storage medium when the detection means has detected that the second removable storage medium has become accessible, and comparing the read data with the data restored by the restoration means,
    wherein the holding means includes second storage means for storing the data restored by the restoration means into a third removable storage medium, and
    wherein the restoration means includes:
        means for prohibiting removal of the third removable storage medium from the holding means; and
        means for releasing the prohibition on the removal of the third removable storage medium when the second removable storage means has become accessible again.

12. A data processing apparatus comprising:
    means for removably holding a plurality of removable storage media;
    means for accessing a first removable storage medium which is one of the removable storage media so as to read the data stored therein;
    means for detecting whether a second removable storage medium, which is one of the removable storage media, is inaccessible or accessible;
    restoration means for accessing the removable storage media held by the holding means other than the second removable storage medium when the detection means has detected the second removable storage medium as inaccessible, so as to read part of data stored in each of the accessed removable storage media, thereby restoring the data stored in the second removable storage medium; and
    comparison means for reading the data stored in the second removable storage medium when the detection means has detected that the second removable storage medium has become accessible, and comparing the read data with the data restored by the restoration means,
    wherein the holding means includes second storage means for storing the data restored by the restoration means into a third removable storage medium, and
    wherein the restoration means includes:
        means for recording a fact of forced removal of the third removable storage medium when the third removable storage medium has been forcedly detached; and
        means for coordinating data stored in the second and third removable storage media when the second removable storage medium has become accessible again and the third removable storage medium has been returned to the holding means.

13. A data processing apparatus comprising:
    holding means for removably holding a plurality of removable storage media;
    accessing means for accessing a first removable storage medium which is one of the removable storage media, so as to read the data stored therein;
    detecting means for detecting whether a second removable storage medium, which is one of the removable storage media, is inaccessible or accessible;
    restoration means for accessing the removable storage medium held by the holding means other than the second removable storage medium when the detection means has detected the second removable storage medium inaccessible, so as to read part of data stored in each of the accessed removable storage media, thereby restoring the data stored in the second removable storage medium;
    means for storing the data restored by the restoration means;
    means for reading the data stored in the second removable storage medium when the detection means has detected that the second removable storage means has become accessible;
    means for comparing the data read by the reading means with the data stored in the storing means;
    means for prohibiting removal of a third removable storage medium from the holding means;
    means for releasing the prohibition of the removal of the third removal storage medium when the second removal storage means has be come accessible again;
    means for recording the fact of forced removal of the third removable storage medium when the third removable storage medium has been forcedly detached; and
    means for coordinating data stored in the second and third removable storage media when the second removable storage medium has become accessible again and the third removable storage medium h as been returned to the holding means.

* * * * *